US008667719B2

(12) United States Patent
Kagen et al.

(10) Patent No.: US 8,667,719 B2
(45) Date of Patent: Mar. 11, 2014

(54) THREE-SIDED CHANNEL SIGN COUPLER

(75) Inventors: Michael Kagen, Chatsworth, CA (US);
Randy Fox, Rochester, MI (US); Ted Fisher, Rochester, MI (US); John Wright, Rochester, MI (US); Ben Shelswell, Waterford, MI (US)

(73) Assignee: Maxwell Alarm Screen Mfg., Inc., Chatsworth, CA (US)

( * ) Notice: Subject to any disclaimer, the term of this patent is extended or adjusted under 35 U.S.C. 154(b) by 0 days.

(21) Appl. No.: 13/015,791

(22) Filed: Jan. 28, 2011

(65) Prior Publication Data
US 2012/0192469 A1    Aug. 2, 2012

(51) Int. Cl.
*G09F 15/00*    (2006.01)

(52) U.S. Cl.
USPC ........................................ 40/607.05; 403/293

(58) Field of Classification Search
USPC ...................... 40/607.04; 248/548; 403/293, 2
See application file for complete search history.

(56) References Cited

U.S. PATENT DOCUMENTS

| 1,986,721 | A | | 5/1933 | Froude | |
|---|---|---|---|---|---|
| 3,820,906 | A | | 6/1974 | Katt | |
| 3,974,619 | A | | 8/1976 | Turner | |
| 4,320,608 | A | * | 3/1982 | Deike | 52/165 |
| 4,433,931 | A | * | 2/1984 | Malish et al. | 403/194 |
| 4,490,062 | A | | 12/1984 | Chisholm | |
| 4,553,358 | A | * | 11/1985 | Deike | 52/98 |
| 4,615,156 | A | * | 10/1986 | Deike | 52/98 |
| 4,843,746 | A | | 7/1989 | DesNoyers et al. | |
| 4,850,555 | A | | 7/1989 | Lemkin et al. | |
| 4,893,455 | A | * | 1/1990 | Hughes | 56/1 |
| 5,214,886 | A | | 6/1993 | Hugron | |
| RE35,133 | E | * | 12/1995 | Halloran, Jr. | 405/244 |
| 5,480,121 | A | | 1/1996 | Rice et al. | |
| 5,535,555 | A | | 7/1996 | Boyd et al. | |
| 5,689,918 | A | * | 11/1997 | Johnson | 52/153 |
| 5,782,040 | A | | 7/1998 | McCartan | |
| 5,887,842 | A | | 3/1999 | Granger | |
| 5,957,425 | A | | 9/1999 | Conway et al. | |
| 6,113,055 | A | | 9/2000 | Salman | |
| 6,216,413 | B1 | | 4/2001 | Lapointe | |
| 6,264,162 | B1 | | 7/2001 | Barnes et al. | |
| 2006/0239764 | A1 | * | 10/2006 | Salman | 403/2 |
| 2008/0034631 | A1 | * | 2/2008 | Kim et al. | 40/607.04 |

* cited by examiner

*Primary Examiner* — Kristina Junge
(74) *Attorney, Agent, or Firm* — Lewis Brisbois Bisgaard & Smith LLC; Jon Hokanson

(57) ABSTRACT

A three-sided channel coupler for connecting the upper and lower portions of a U-shaped sign post, the coupler comprising two U-shaped elements, an outer three-sided, U-shaped element and an inner, three-sided U-shaped element, the three sides of each element comprising a transverse face and two lateral legs, the inner element being smaller than the outer element, a plurality of cross-braces attached to the two lateral legs of each element to hold the two elements together and a plurality of vertical ribs on the inner surface of the outer element and on the outer surface of the inner element.

3 Claims, 5 Drawing Sheets

THREE-SIDED CHANNEL SIGN COUPLER

FIELD OF THE INVENTION

The invention comprises a coupler for connecting two sections of a sign post together.

BACKGROUND OF THE INVENTION

The present invention relates to a two-piece stake system comprising an upper stake or post and a lower stake or post which are held together to display a yard type sign for residential and commercial locations. Stakes for these purposes are commonly made of one section. This invention connects two stakes together with an overall assembled length approximately equal to a one section stake for ease of shipping and handling. This type of yard sign is usually attached to a stake which ranges from about 24 inches to about 48 inches in overall height/length. Typical signs of this type include burglar alarm/security signs, real estate signs, political signs, warning signs, no trespassing signs, animal control signs, etc.

Most importantly the two piece stake system lowers packaging and shipping cost and reduces possible stake damage in shipment compared to a single piece stake. The two piece stake system provides a convenient and cost effective way to distribute/ship signs to the end user. Presently, there are two stake signs which are connected together by punching holes in the stakes and affixing the parts together with screws. A need has existed to provide a better method of affixing multi-stake sign pieces together, that not only saves on shipping and packaging costs but would replace hole punching/screws, thereby saving on material and labor cost.

SUMMARY OF THE INVENTION

The invention comprises a three-sided coupler for a U-shaped sign post or stake. The coupler is preferably made of light weight nylon, strong enough to keep the stakes rigid and to support the sign display. The coupler is designed to hold an upper U-shaped channel stake and a lower U-shaped channel stake together, to display a yard sign for residential and commercial locations.

The channel coupler comprises two U-shaped elements, each having a transverse section, the face of the U-shape, and two legs, the lateral portions of the U-shape. One of the two U-shaped elements is smaller than the other, and is adapted to fit inside of the other. The two elements are fixedly held together by cross-braces, horizontal bars and by a center brace which acts as a stop for the two sections of the U-shaped sign post/stake when it is pushed into the U-shaped space between the two U-shaped elements of the channel.

The coupler comprises a series of vertical ribs which aid in keeping the U-shaped channel stakes tightly held in the coupler. The vertical ribs on the inside of the larger U-shaped element and on the outside of the smaller U-shaped element act to hold the U-shaped sign post/stake frictionally tightly in place.

The cross-braces between the two U-shaped elements also help to hold the U-shaped sign post/stake in place by preventing the two elements from separating.

DETAILED DESCRIPTION OF THE INVENTION

Figure 1:
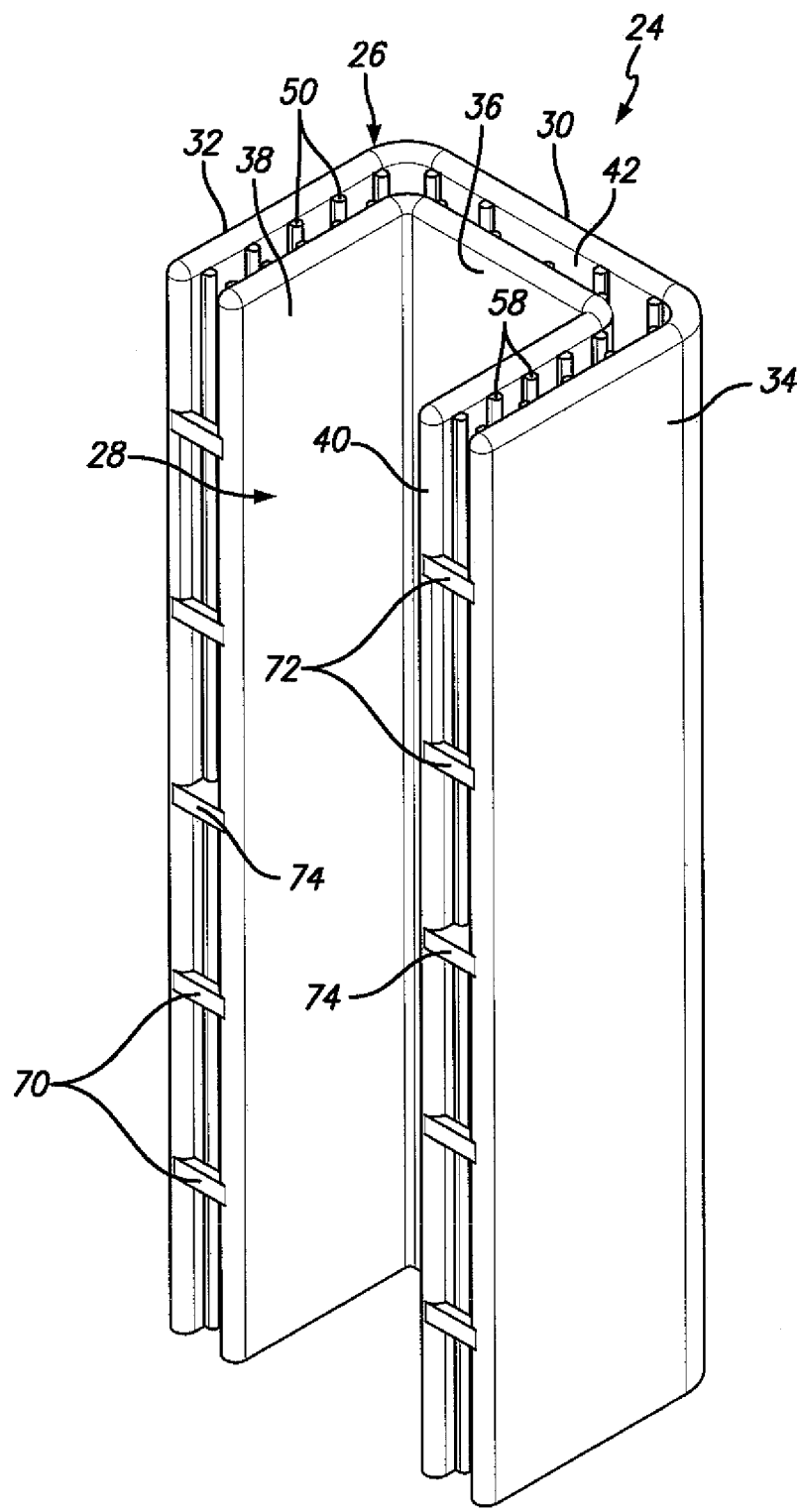
FIG. 1 is a perspective view of the coupler of this invention.
Figures 2, 3:
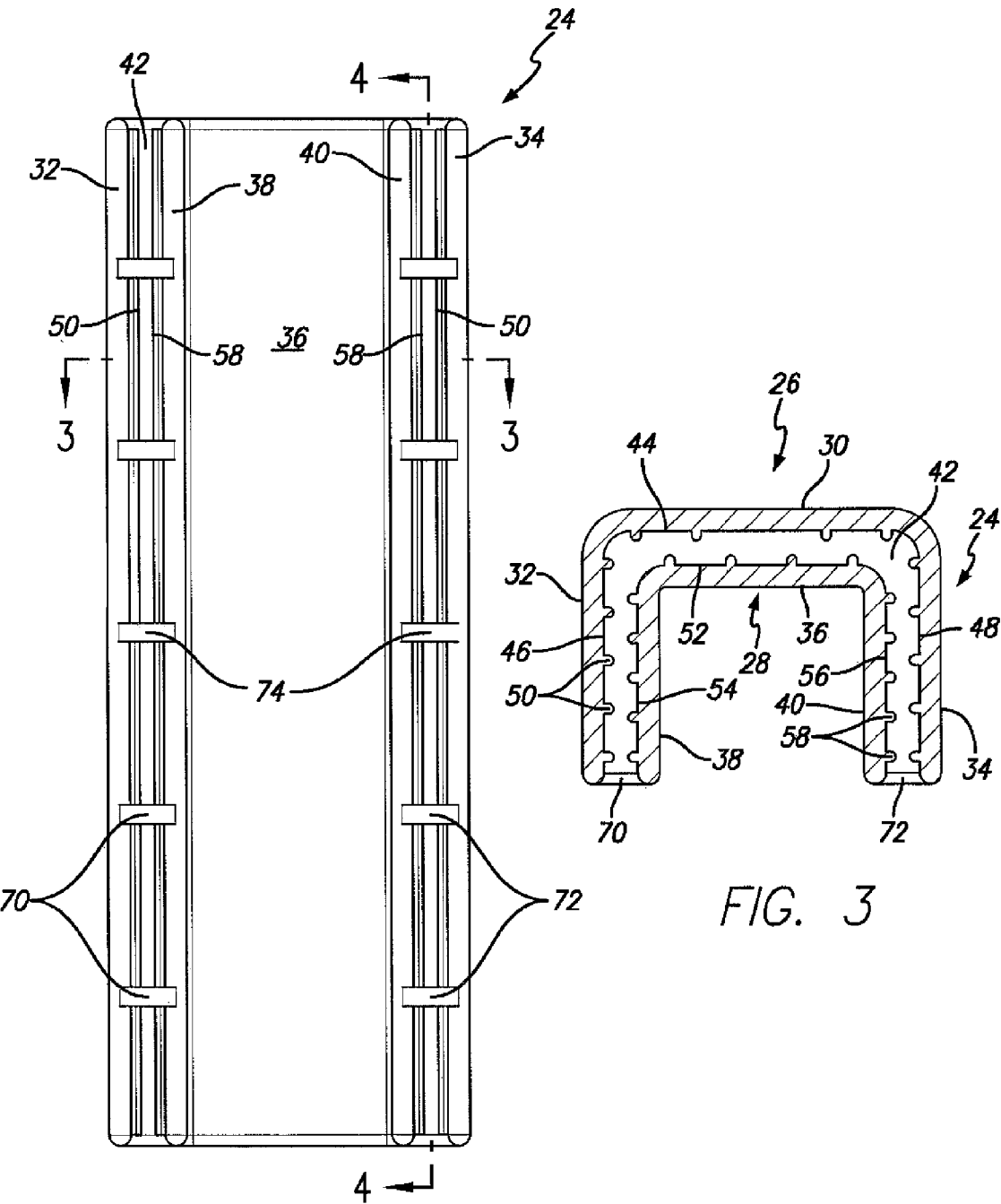
FIG. 2 is a front view.
FIG. 3 is a cross-section view taken on lines 3-3 of FIG. 2.
Figure 4:
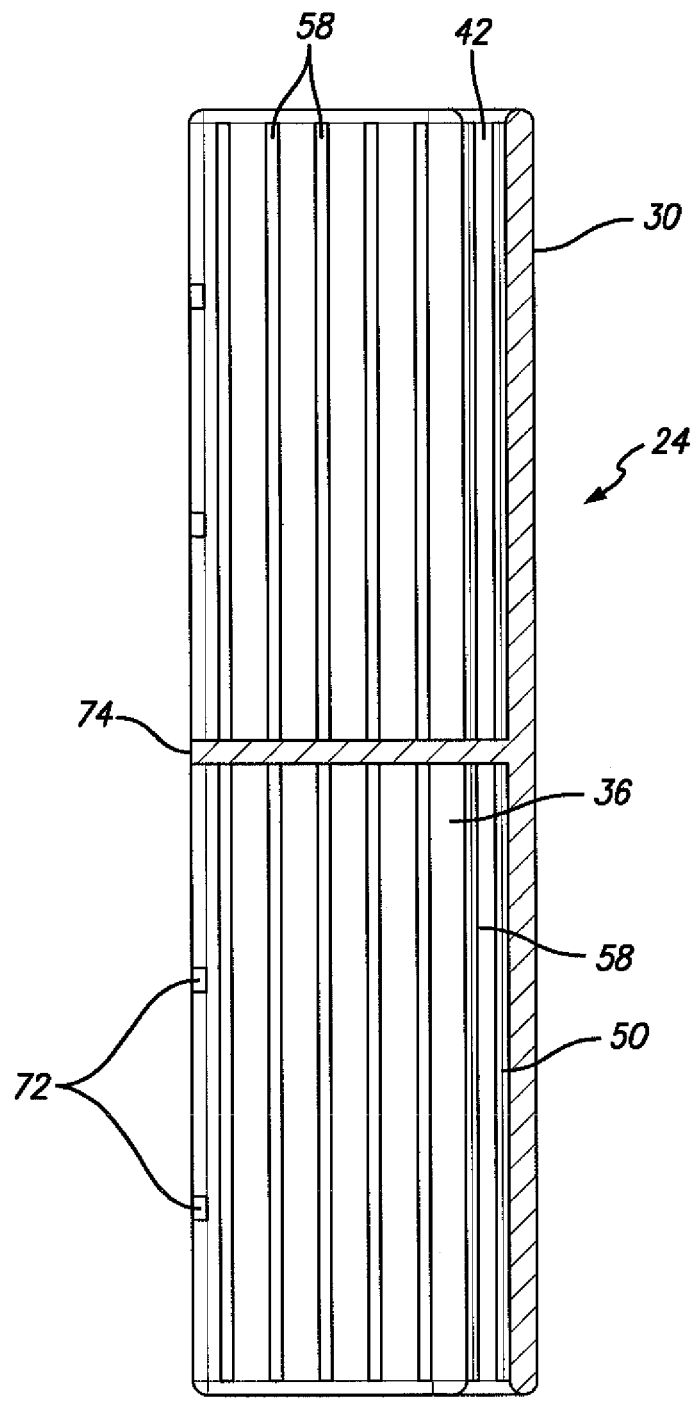
FIG. 4 is a cross-section view taken on lines 4-4 of FIG. 2.
Figure 5:
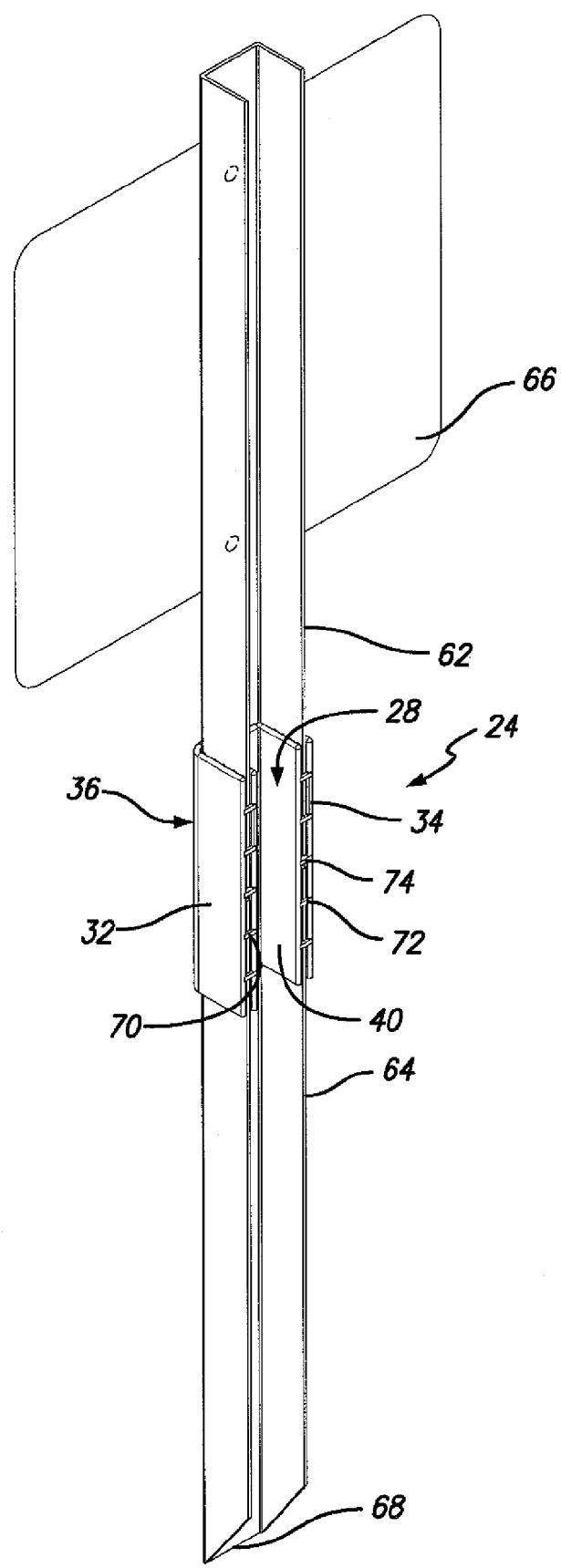
FIG. 5 is a rear perspective view of the assembled sign; and,
FIG. 6 is a rear perspective view of a prior art sign.
Figure 6:
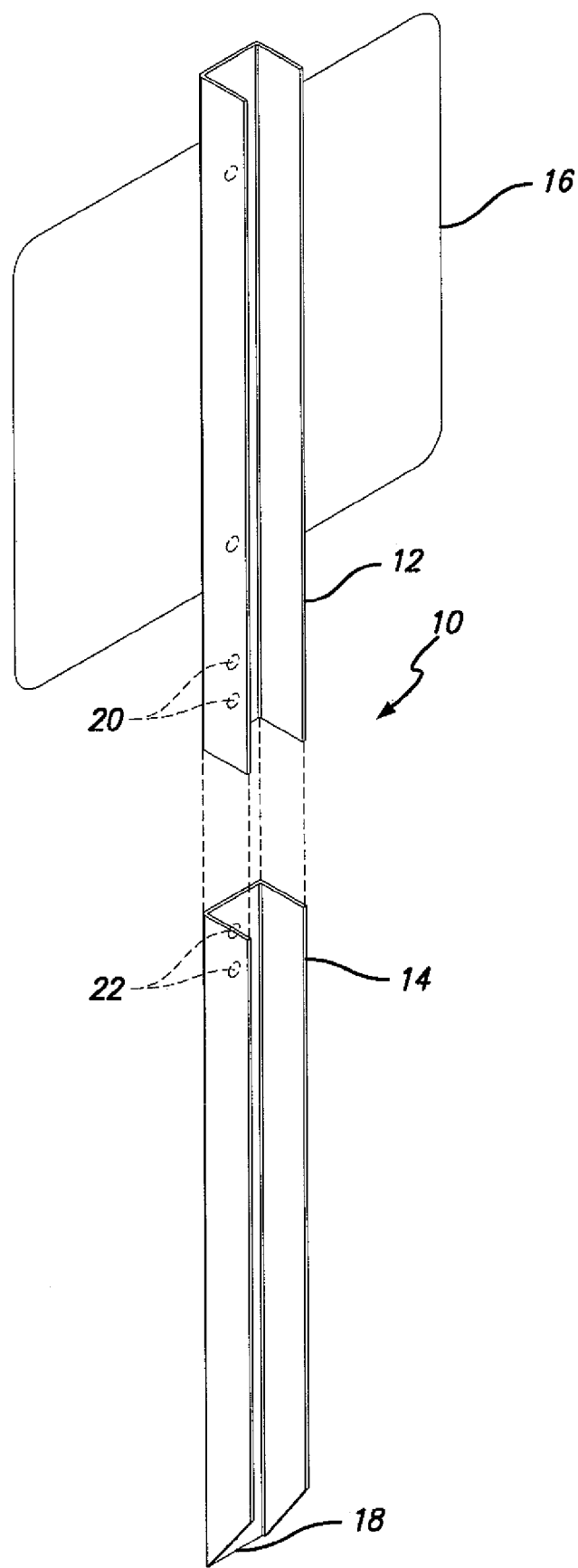

Referring now to the drawings there is shown in FIG. 6, a prior art sign 10. The sign 10 comprises an upper stake 12, a lower stake 14 and a sign 16. Sign stakes have been made this way to reduce packaging size and cost and because a sign with a one-piece stake is more expensive to ship. Two stake signs with reduced packaging size also use up less shelf space, which is at a premium. Total sign lengths vary depending on request and can be customized per customer. Common lengths of signs, as shown in FIG. 6, are about 16 inches for both lower stake 14 and upper stake 12, with a two inch overlap for a 30 inch overall length; two 19 or 20 inch stakes with a 2 inch or 4 inch overlap for a 36 inch overall length; two 13 inch stakes with a 2 inch overlap for a 24 inch overall length. However, the total length of the signs of this invention, may be custom made to any length desired by the customer.

Lower stake 14 has a beveled bottom edge 18 to aid in pushing it into the ground a sufficient distance to firmly hold the sign. Depending on the firmness of the ground, lower stake 18 may be driven into the ground from about 4 inches to about 8 inches, but it can be more or less depending on the circumstances.

Upper stake 12 is very slightly smaller in width than stake 14 so that it tightly slides into lower stake 14. Upper stake 12 is inserted into lower stake 14 until screw holes 20 in stake 12 match up with screw holes 22 in stake 14 and then screws are inserted and tightened to hold the two stake portions together.

Referring now to FIGS. 1-5, there is shown the three-sided, U-shaped coupler 24. Coupler 24 comprises two three-sided, U-shaped elements or portions, 26 and 28. Portion 26 comprises transverse face 30 and two parallel lateral legs 32 and 34, the three sides forming the U-shape. Portion 28 comprises transverse face 36 and two parallel lateral legs 38 and 40, the three sides forming the U-shape.

U-shaped portion 28 is smaller than U-shaped portion 26, in that transverse face 36 is shorter than transverse face 30. Lateral legs 38 and 40 are shorter than lateral legs 32 and 34. This allows U-shaped portion 28 to fit inside of U-shaped portion 26, forming a U-shaped channel or slot 42 to receive the upper 62 and lower 64 U-shaped sign stakes.

The inside surfaces 44, 46 and 48 of all three sides of U-shaped portion 26 have a plurality of vertical ribs 50. The outside surfaces 52, 54 and 56 of U-shaped portion 28 have a plurality of vertical ribs 58. Slot 42 is sized to frictionally, tightly hold the upper stake portion 62 and the lower stake portion 64 when they are each pushed into slot 42. Ribs 50 and 58 aid in tightly holding upper stake 62 and lower stake 64. Upper stake 62 has sign 66 affixed thereto by screws or other means. Lower stake 64 has a beveled bottom edge 68 for ease in pushing it into the ground. Lower stake 64 could also be permanently fixed into cement or other hard substance.

U-shaped portion 26 and U-shaped portion 28 are fixed together by a plurality of cross-braces 70 and 72 to hold the two portions together in a spaced relationship, so that they grip the upper and lower stakes tightly and do not separate. A U-shaped stop bar 74 is fixed in place substantially in the middle, one-half of the way down the coupler, so that the upper and lower stakes are stopped from going more than one-half way into the coupler. Stop bar 74 is about ⅛ inch thick.

A common sign stake of the type described herein is about 0.050 inches thick and the coupler slot between the two U-shaped elements is about 0.065 inches wide, measured from the faces of the vertical ribs. The sign stakes may vary however from about 0.030 to about 0.070 inches thick and the slot adjusted accordingly to be slightly larger than the stake thickness, but able to tightly hold the stake. Common sign stakes have a 0.75 inch face and 0.5 inch legs or a 0.5 inch face and 0.5 inch legs and the coupler is manufactured to fit those stakes. The stake dimensions however, along with the coupler's dimensions, can vary and be manufactured to meet a customer's requirements.

The coupler is preferably made from a hard plastic material such as nylon, polyethylene, polypropylene, or the like. The coupler may be from about 2 inches long to about 4 inches long, preferably about 2.5 inches long and is manufactured by an injection molding process.

The three-sided coupler of this invention provides a far simpler method of affixing the two stake portions together, which not only saves on shipping and packaging costs but also saves on material and labor costs compared to prior art signs.

Having thus described the invention, we claim:

1. A two-piece stake system comprising:
   a three-sided coupler having a lower half, an upper half and made of a hard plastic selected from the group consisting essentially of nylon, polyethylene, polypropylene, or other plastic material;
   a lower stake having a lower beveled end and an upper end positioned in the lower half of said coupler;
   an upper stake positioned in the upper half of said coupler;
   said coupler having an outer U-shaped member comprising a first outer leg, a second outer leg and an outer transverse leg joining said first outer leg and said second outer leg to form said outer U-shaped member;
   said coupler having an inner U-shaped member comprising a first inner leg, a second inner leg and an inner transverse leg joining said first inner leg and said second inner leg to form said inner U-shaped member;
   said first outer leg having an inside surface facing said first inner leg, a predetermined vertical height, a predetermined thickness and a predetermined transverse width;
   said first inner leg having an outside surface facing said first outer leg, a predetermined vertical height, a predetermined thickness and a predetermined transverse width;
   said first inner leg predetermined transverse width shorter than said first outer leg predetermined transverse width;
   said second outer leg having an inner surface facing said second inner leg, a predetermined vertical height, a predetermined thickness and a predetermined transverse width;
   said second inner leg having an outer surface facing said second outer leg, a predetermined vertical height, a predetermined thickness and a predetermined transverse width;
   said second inner leg predetermined transverse width shorter than said second outer leg predetermined transverse width;
   said outer transverse leg having an inner surface facing said inner transverse leg, a predetermined vertical height, a predetermined thickness and a predetermined transverse width;
   said inner transverse leg having an outer surface facing said outer transverse leg, a predetermined vertical height, a predetermined thickness and a predetermined transverse width;
   said inner transverse leg predetermined transverse width shorter than said outer transverse leg predetermined transverse width;
   said first outer leg inner surface having five ribs protruding toward said first inner leg outer surface and vertically extending along said first outer leg;
   said first inner leg outer surface having five ribs protruding toward said first outer leg inner surface and vertically extending along said first inner leg;
   one of said first outer leg ribs positioned directly opposite one of said first inner leg ribs and four of said first outer leg ribs and four of said first inner leg ribs positioned in non-directly opposite relationships, each to the other;
   said second outer leg inner surface having five ribs protruding toward said second inner leg outer surface and vertically extending along said second outer leg;
   said second inner leg outer surface having five ribs protruding toward said second outer leg inner surface and vertically extending along said second inner leg;
   one of said second outer leg ribs positioned directly opposite one of said second inner leg ribs and four of said second outer leg ribs and four of said second inner leg ribs positioned in non-directly opposite relationships, each to the other;
   said outer transverse leg inner surface having four ribs protruding toward said inner transverse leg outer surface and vertically extending along said outer transverse leg;
   said inner transverse leg outer surface having four ribs protruding toward said outer transverse leg inner surface and vertically extending along said transverse inner leg;
   all of said outer transverse leg ribs and all of said inner transverse leg ribs positioned in non-directly opposite relationships, each to the other;
   two cross-braces positioned along the upper half of said coupler and fixedly attaching said first outer leg distal end to said first inner leg distal end;
   two cross-braces positioned along the upper half of said coupler and fixedly attaching said second outer leg distal end to said second inner leg distal end;
   two cross-braces positioned along the lower half of said coupler and fixedly attaching said first outer leg distal end to said first inner leg distal end;
   two cross-braces positioned along the lower half of said coupler and fixedly attaching said second outer leg distal end to said second inner leg distal end; and,
   a U-shaped stop bar fixedly positioned at substantially at mid-height of said coupler, between said outer U-shaped member and said inner U-shaped member and adapted to prevent said upper stake and said lower stake to extend beyond one-half way into said coupler.

2. A two-piece stake system coupler comprising:
   a three-sided coupler having a lower half and an upper half;
   said lower half adapted to accommodate a lower stake upper end;
   said upper half adapted to accommodate an upper stake lower end;
   said coupler having an outer U-shaped member comprising a first outer leg, a second outer leg and an outer transverse leg joining said first outer leg and said second outer leg to form said outer U-shaped member;
   said coupler having an inner U-shaped member comprising a first inner leg, a second inner leg and an inner transverse leg joining said first inner leg and said second inner leg to form said inner U-shaped member;
   said first outer leg having an inside surface facing said first inner leg, a predetermined vertical height, a predetermined thickness and a predetermined transverse width;
   said first inner leg having an outside surface facing said first outer leg, a predetermined vertical height, a predetermined thickness and a predetermined transverse width;

said first inner leg predetermined transverse width shorter than said first outer leg predetermined transverse width;

said second outer leg having an inner surface facing said second inner leg, a predetermined vertical height, a predetermined thickness and a predetermined transverse width;

said second inner leg having an outer surface facing said second outer leg, a predetermined vertical height, a predetermined thickness and a predetermined transverse width;

said second inner leg predetermined transverse width shorter than said second outer leg predetermined transverse width;

said outer transverse leg having an inner surface facing said inner transverse leg, a predetermined vertical height, a predetermined thickness and a predetermined transverse width;

said inner transverse leg having an outer surface facing said outer transverse leg, a predetermined vertical height, a predetermined thickness and a predetermined transverse width;

said inner transverse leg predetermined transverse width shorter than said outer transverse leg predetermined transverse width;

said first outer leg inner surface having five ribs protruding toward said first inner leg outer surface and vertically extending along said first outer leg;

said first inner leg outer surface having five ribs protruding toward said first outer leg inner surface and vertically extending along said first inner leg;

one of said first outer leg ribs positioned directly opposite one of said first inner leg ribs and four of said first outer leg ribs and four of said first inner leg ribs positioned in non-directly opposite relationships, each to the other;

said second outer leg inner surface having five ribs protruding toward said second inner leg outer surface and vertically extending along said second outer leg;

said second inner leg outer surface having five ribs protruding toward said second outer leg inner surface and vertically extending along said second inner leg;

one of said second outer leg ribs positioned directly opposite one of said second inner leg ribs and four of said second outer leg ribs and four of said second inner leg ribs positioned in non-directly opposite relationships, each to the other;

said outer transverse leg inner surface having four ribs protruding toward said inner transverse leg outer surface and vertically extending along said outer transverse leg;

said inner transverse leg outer surface having four ribs protruding toward said outer transverse leg inner surface and vertically extending along said transverse inner leg;

all of said outer transverse leg ribs and all of said inner transverse leg ribs positioned in non-directly opposite relationships, each to the other;

two cross-braces positioned along the upper half of said coupler and fixedly attaching said first outer leg distal end to said first inner leg distal end;

two cross-braces positioned along the upper half of said coupler and fixedly attaching said second outer leg distal end to said second inner leg distal end;

two cross-braces positioned along the lower half of said coupler and fixedly attaching said first outer leg distal end to said first inner leg distal end;

two cross-braces positioned along the lower half of said coupler and fixedly attaching said second outer leg distal end to said second inner leg distal end; and, a U-shaped stop bar fixedly positioned at substantially at mid-height of said coupler, between said outer U-shaped member and said inner U-shaped member and adapted to prevent said upper stake and said lower stake to extend beyond one-half way into said coupler.

3. A stake coupler comprising:

a coupler having a lower half and an upper half;

said lower half adapted to accommodate a lower stake upper end;

said upper half adapted to accommodate an upper stake lower end;

said coupler having an outer U-shaped member comprising a first outer leg, a second outer leg and an outer transverse leg joining said first outer leg and said second outer leg to form said outer U-shaped member;

said coupler having an inner U-shaped member comprising a first inner leg, a second inner leg and an inner transverse leg joining said first inner leg and said second inner leg to form said inner U-shaped member;

said first outer leg having an inside surface facing said first inner leg, a predetermined vertical height, a predetermined thickness and a predetermined transverse width;

said first inner leg having an outside surface facing said first outer leg, a predetermined vertical height, a predetermined thickness and a predetermined transverse width;

said outer transverse leg having an inner surface facing said inner transverse leg, a predetermined vertical height, a predetermined thickness and a predetermined transverse width;

said inner transverse leg having an outer surface facing said outer transverse leg, a predetermined vertical height, a predetermined thickness and a predetermined transverse width;

said inner transverse leg predetermined transverse width shorter than said outer transverse leg predetermined transverse width;

said coupler outer U-shaped member inner surface having a plurality of ribs made of a plastic material, said outer U-shaped member ribs protruding toward said first coupler inner U-shaped member outer surface and positioned vertically along said coupler;

said coupler inner U-shaped member outer surface having a plurality of ribs made of a plastic material, said inner U-shaped member ribs protruding toward said coupler U-shaped member inner surface and positioned vertically along said coupler;

a cross-brace positioned along the upper half of said coupler and fixedly attaching said first outer leg distal end to said first inner leg distal end;

a cross-brace positioned along the upper half of said coupler and fixedly attaching said second outer leg distal end to said second inner leg distal end;

a cross-brace positioned along the lower half of said coupler and fixedly attaching said first outer leg distal end to said first inner leg distal end;

a cross-brace positioned along the lower half of said coupler and fixedly attaching said second outer leg distal end to said second inner leg distal end; and, a stop bar fixedly positioned in said coupler, between said outer U-shaped member and said inner U-shaped member and adapted to retain said upper stake and said lower stake within said coupler. Between said outer U-shaped member and said inner U-shaped member.

* * * * *